United States Patent [19]
Klink

[11] Patent Number: 5,335,974
[45] Date of Patent: Aug. 9, 1994

[54] RETROFIT OF RAILCAR AIR BRAKE SYSTEM WITH ELECTRONIC CONTROLLER AND AIR DISTRIBUTION APPARATUS

[75] Inventor: Douglas D. Klink, Kansas City, Mo.

[73] Assignee: Technical Services & Marketing, Inc., Kansas City, Mo.

[21] Appl. No.: 34,406

[22] Filed: Mar. 19, 1993

[51] Int. Cl.⁵ ............................................. B60T 13/00
[52] U.S. Cl. ............................................ 303/7; 303/15
[58] Field of Search ................................. 303/7-9, 303/3, 15, 29, 35, 86, 22.6–22.8, 20

[56] References Cited
U.S. PATENT DOCUMENTS

| | | | |
|---|---|---|---|
| 4,509,801 | 4/1985 | Newton et al. | 303/8 |
| 4,586,584 | 5/1986 | Auman et al. | 303/7 X |
| 5,249,125 | 9/1993 | Root et al. | 303/20 X |

Primary Examiner—Robert J. Oberleitner
Assistant Examiner—Josie A. Ballato
Attorney, Agent, or Firm—Hovey, Williams, Timmons & Collins

[57] ABSTRACT

An air distribution apparatus (10) is configured for retrofit between the service portion (24) and pipe bracket portion (26) of a conventional AB valve (16) of a railroad car braking system (12) for allowing operation with an electronic controller (14). The apparatus contains openings and passageways compatible with the connections between the service and pipe bracket portions of the AB valve while providing additional conduits to mate with the electronic control device.

7 Claims, 4 Drawing Sheets

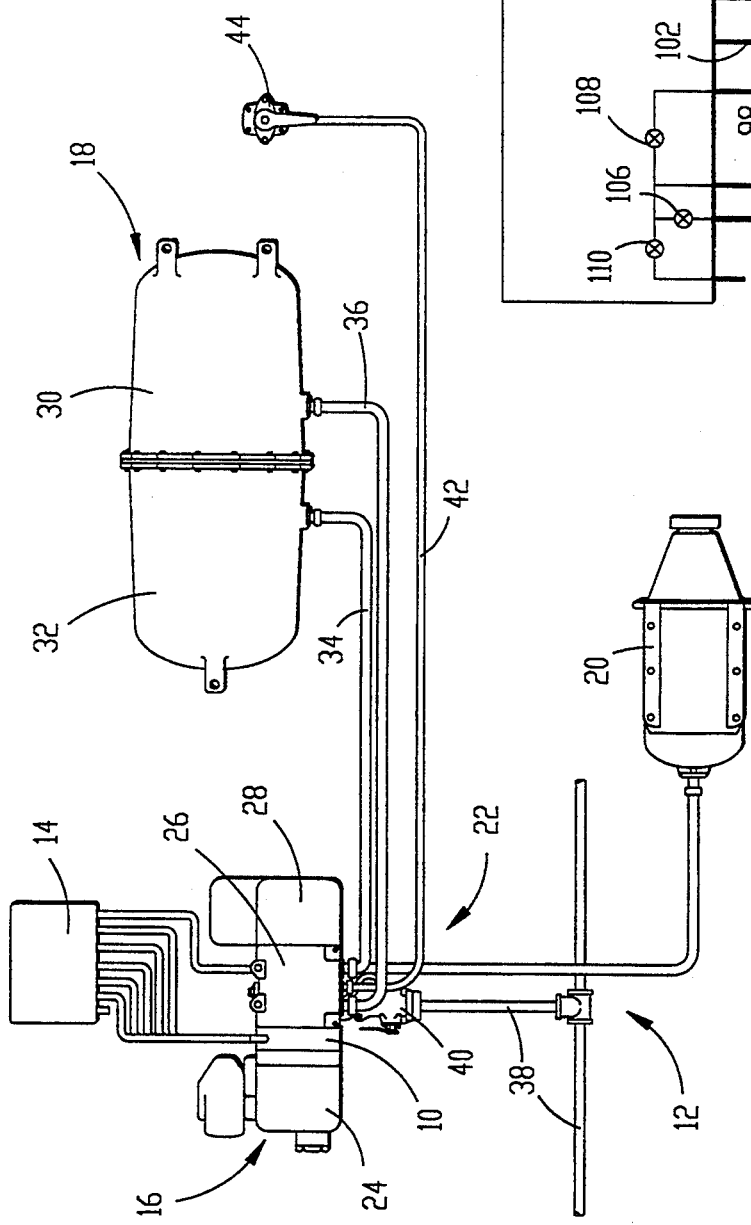
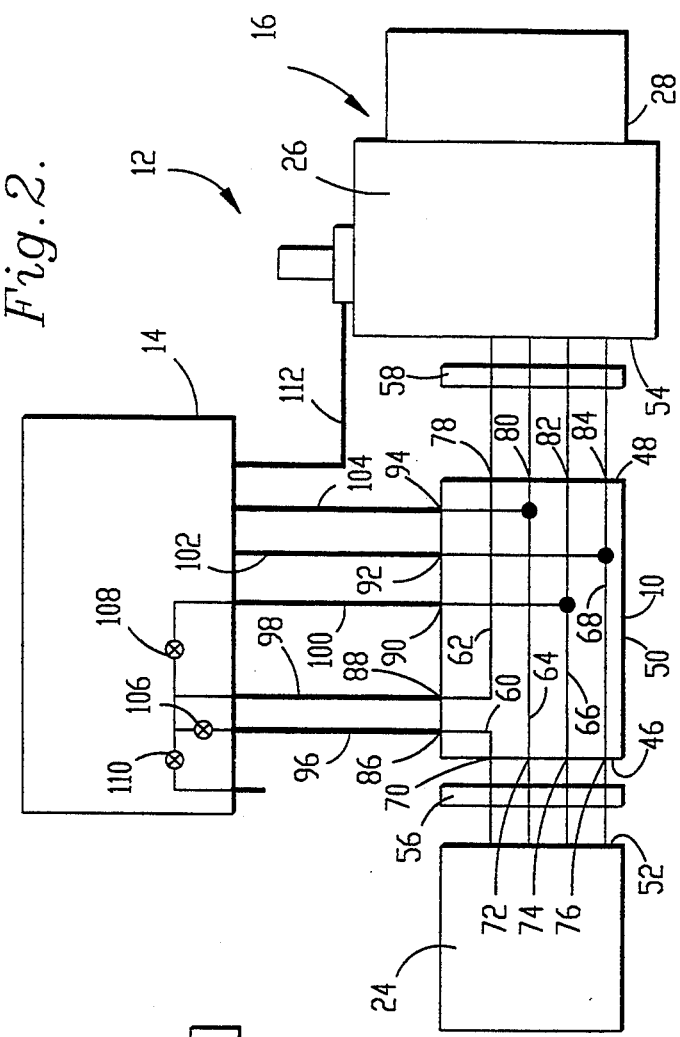
Fig. 2.
Fig. 1.

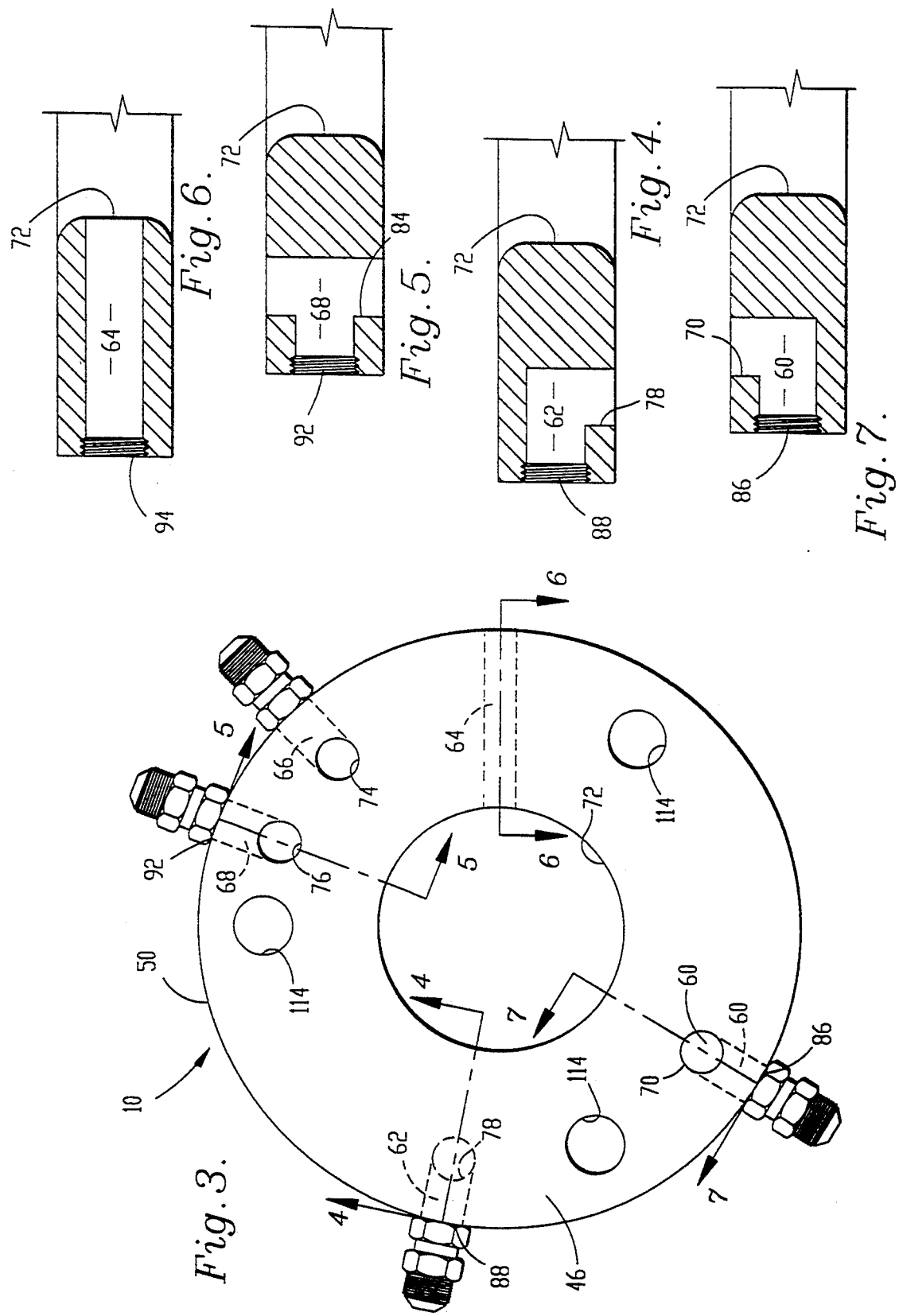

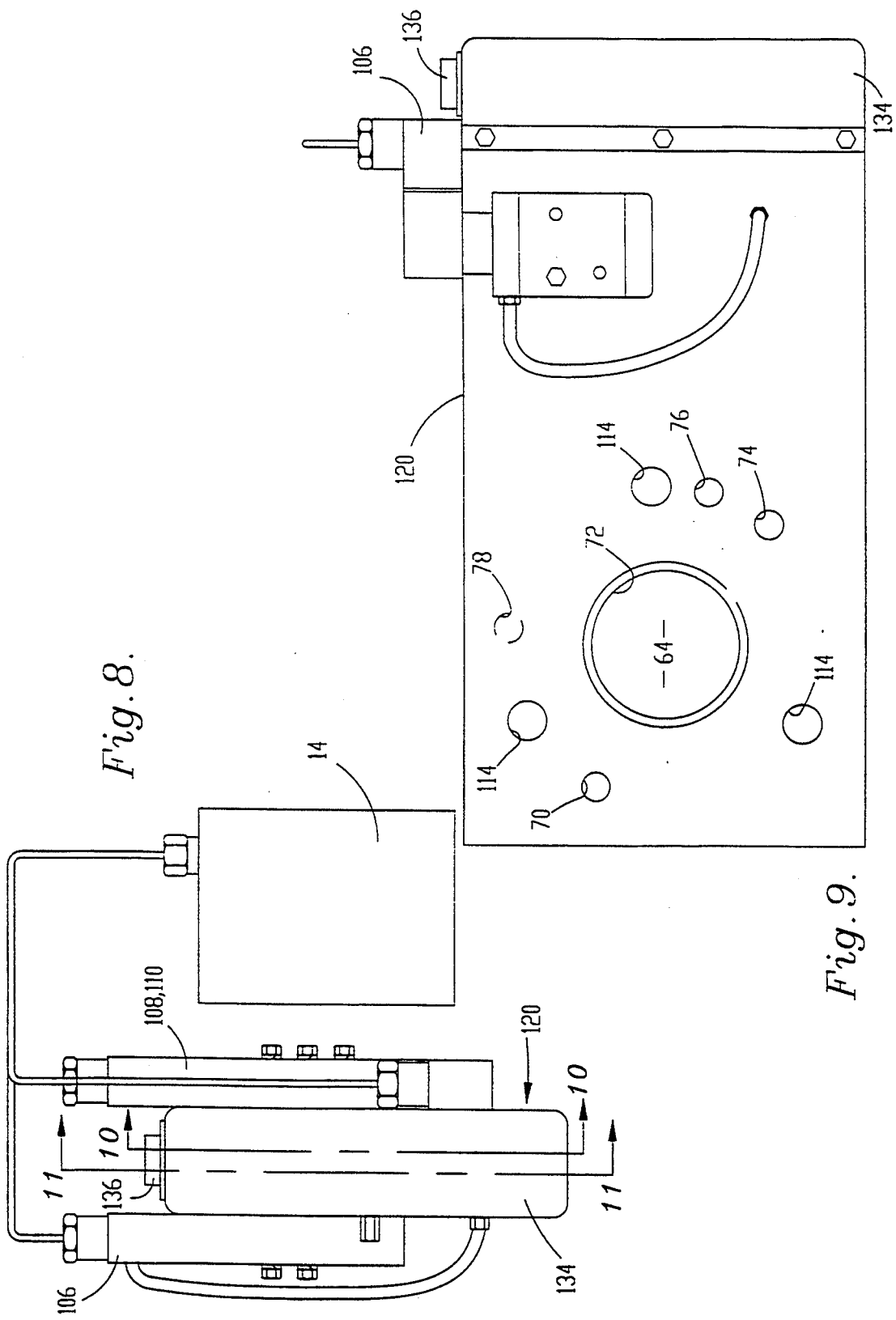

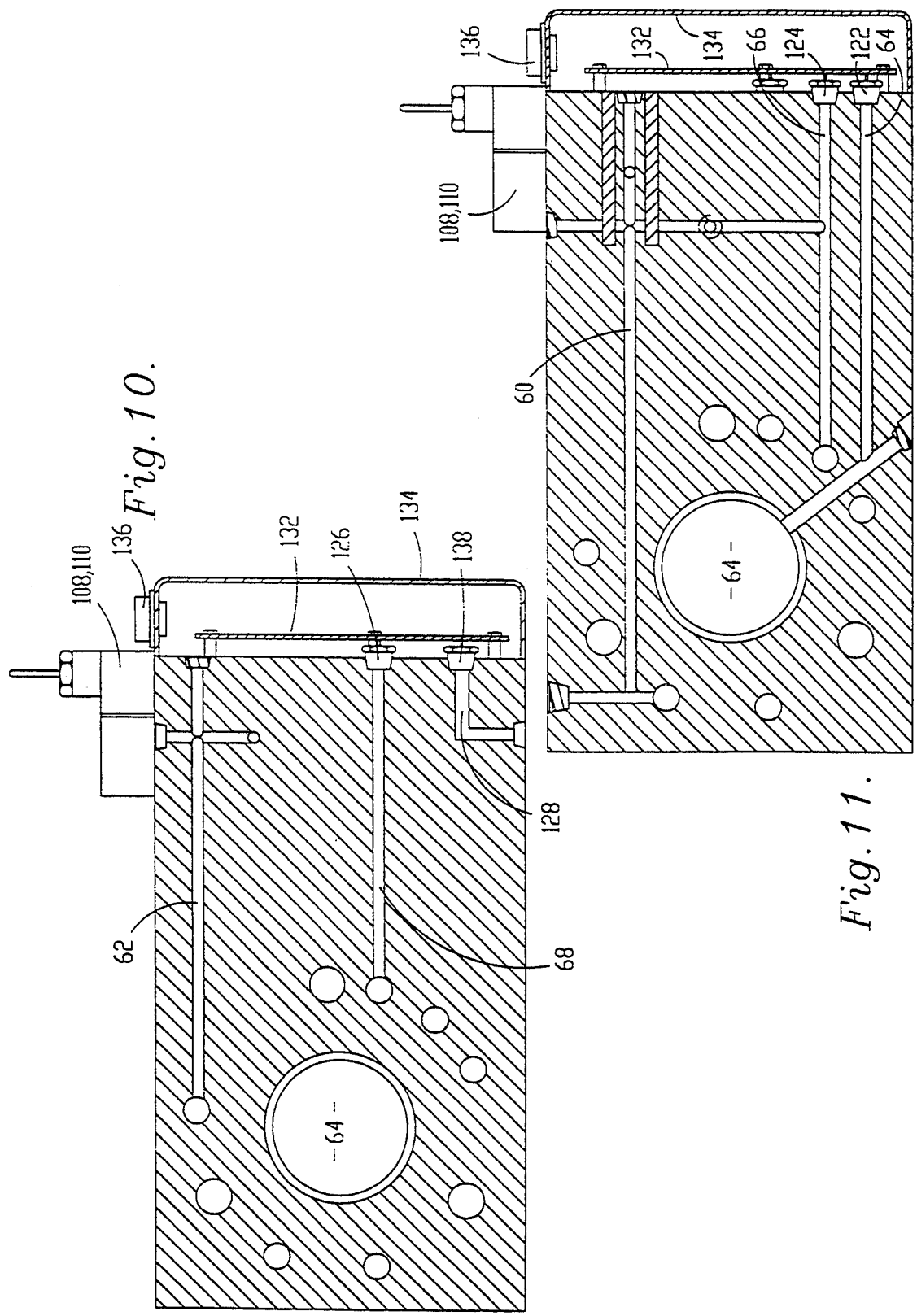

RETROFIT OF RAILCAR AIR BRAKE SYSTEM WITH ELECTRONIC CONTROLLER AND AIR DISTRIBUTION APPARATUS

BACKGROUND OF THE INVENTION

1. Field of the Invention

The present invention concerns railroad braking systems. More particularly, the invention relates to an air distribution apparatus configured for retrofit with an existing airbrake valve to act as an interface with an electronic braking control device.

2. Description of the Prior Art

A typical prior art braking system for a railroad car includes a control valve, a dual chamber air tank, a brake cylinder and distribution piping. Operating air is supplied from the railroad locomotive to the cars by way of a brake pipe that runs along the length of the train with the coupling between cars being in the form of rubber hoses. To those skilled in the art, the control valve is known generically as an "AB" valve, which is produced as various models such as an ABDW valve, and includes an service portion, an emergency portion and a pipe bracket portion therebetween. The air tank chambers include an auxiliary reservoir and an emergency reservoir.

During startup, supply air received from the brake pipe is distributed by the control valve to the two reservoirs until sufficient pressure has built up. In operation, the engineer activates a valve in the locomotive to cause a drop in the brake pipe pressure. The service portion of the control valve responds to the pressure drop as an air signal to distribute air at a pressure corresponding to the air signal from the auxiliary reservoir to the brake cylinder. In other words, the amount of braking force to the car is proportional to the drop in pressure in the brake pipe. For example, the brake pipe is normally pressurized at about 90 psi and a pressure drop of about 20 psi is a signal to the control valve to supply full braking pressure from the auxiliary reservoir to the brake cylinder.

In the event of a sudden, substantial pressure drop (in excess of 20 psi) in the brake pipe, the emergency portion of the control valve delivers full braking pressure from the emergency reservoir to the brake cylinder. Such might occur, for example, when a car becomes disconnected from the rest of the train, which vents all of the air pressure from that section of the brake pipe.

As those skilled in the art appreciate, the prior art braking systems present a number of problems. For example, the air pressure signal initiated in the engine propagates along the brake pipe at the speed of sound. With a long train, the cars in the front of the train are braked sooner than the cars in the rear, resulting in "run in." Another problem is that all of the cars are braked with the same braking force proportional to the brake pipe signal regardless of variations in the weight of the car. This means that an empty car will slow down more quickly resulting in run in and in extreme cases could result in locked wheels with the attendant damage and wear, and possible derailment.

In response to these problems, some prior art solutions have proposed an electronically controlled braking system in which wireless signals from the engine are transmitted to respective receivers on the cars. This effectively eliminates propagation delay and allows onboard, individualized, electronic control of the braking of each car. These prior art electronic braking systems, however, are not adapted to operate compatibly with conventional air brake systems. As a result, all of the cars of the train must be electronically equipped, which makes economic conversion impractical.

SUMMARY OF THE INVENTION

The air distribution apparatus of the present invention solves the prior art problems discussed above and provides a distinct advance in the state of the art. More particularly, the apparatus hereof is configured to retrofit with existing models of AB valves and provide an interface with an electronic braking control device in order to allow a practical conversion of a railroad fleet to electronic braking control.

Broadly, the preferred apparatus includes a valve body having air passages configured to mate with an electronic air controller and with the corresponding air passages of respective portions of an AB valve. More particularly, one set of air passages are configured to allow the electronic controller to control the air pressure delivered from the air tank to the brake cylinder.

In one embodiment, the distribution apparatus is configured as a cylindrical body with the opposed faces thereof configured to mate with the corresponding faces of respective control valve portions and with the periphery presenting openings for connection with an electronic controller. In a second embodiment, the apparatus presents a valve body configured to include the electronic control therein.

BRIEF DESCRIPTION OF THE DRAWINGS

FIG. 1 is a piping diagram of a railroad car braking system showing the apparatus of the present invention coupled between respective control valve portions and coupled with an electronic controller;

FIG. 2 is a schematic representation of the system of FIG. 1 illustrating the internal air passages of the apparatus;

FIG. 3 is a right face view of the apparatus of FIG. 1;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 7 is a sectional view taken along line 7—7 of FIG. 3;

FIG. 8 is a side view of a second embodiment of the apparatus of the present invention;

FIG. 9 is a left face view of the apparatus of FIG. 8;

FIG. 10 is a sectional view taken along line 10—10 of FIG. 8; and

FIG. 11 is a sectional view taken along line 11—11 of FIG. 8.

DETAILED DESCRIPTION OF THE PREFERRED EMBODIMENT

FIG. 1 illustrates preferred air distribution apparatus 10 coupled with a conventional railroad car air brake system 12 and with an electronic controller 14. Brake system includes ABDW control valve 16, air tank 18, brake cylinder 20, all interconnected by the air piping assembly 22.

Control valve 16 includes service portion 24, pipe bracket portion 26 and emergency portion 28 with apparatus 10 coupled between service and pipe bracket portions 22 and 24. Air tank 18 is divided internally to define auxiliary reservoir 30 and emergency reservoir 32.

Piping assembly 22 includes line 34 connecting emergency reservoir 32 with valve emergency portion 28, line 36 connecting auxiliary reservoir with valve service portion 24, and line 38 connecting pipe bracket portion 26 with brake cylinder 20. Additionally, assembly 22 includes brake pipe 38 extending along the length of the railroad car and connected with pipe bracket portion 26 by way of shutoff valve 40. Assembly 22 also includes vent line 42 connecting pipe bracket portion 26 with valve 44, which is used to vent air from brake cylinder 26.

Electronic controller 14 is conventional in nature and the preferred controller is available from Technical Service and Marketing, Inc. of Kansas City, Mo. as model number 81-50101. Various pneumatic lines interconnect controller 14 with apparatus 10 and with pipe bracket 26 as discussed further hereinbelow in connection with FIGS. 2-7.

Referring now to FIGS. 2 and 3, cylindrically shaped apparatus 10 is preferably composed of aluminum and presents service connection face 46, pipe bracket connection face 48, and periphery 50. Faces 46 and 48 are machined to mate respectively with service portion surface 52 and pipe bracket surface 54. Gaskets 56 and 58 provide a seal between adjacent surfaces as illustrated in FIG. 2. Apparatus 10 presents a thickness of about 1.0 inches and a diameter of about seven inches. These dimensions allow insertion between service and pipe bracket portions 24 and 26 without extending the overall length of AB control valve 16 beyond the limits of the space provided on a conventional railroad car.

Apparatus 10 is further machined to include a plurality of internal air passages: service passage 60, brake cylinder passage 62, brake pipe sensor passage 64, auxiliary reservoir supply passage 66, and emergency reservoir supply passage 68. These passages terminate at various openings in the body of apparatus 10. More particularly, passages 60 and 64-68 terminate at openings 70, 72, 74 and 76 respectively defined in service connection face 46 and configured to mate with corresponding openings in service portion surface 52. Similarly, passages 62 and 64-68 terminate at pipe bracket connection face 48 as respective openings 78, 80, 82 and 84 configured to mate with corresponding openings in pipe bracket surface 54.

Additionally, each of the passages 60-68 terminates at periphery 50 as openings 86, 88, 90, 92 and 94 respectively. Piping lines 96, 98, 100, 102 and 104 interconnect openings 86-94 with corresponding openings of electronic controller 14 so that the passages 60-68 continue into controller 14.

Within controller 14, passage 60 terminates at normally open cut-out valve 106, passage 66 terminates at normally closed fill valve 108, and passage 62 terminates at the opposed sides of valves 106 and 108 and at normally closed vent valve 110. The other side of valve 110 is exposed to atmosphere in order to vent brake cylinder 20.

With reference to FIG. 2, service portion 24 normally provides controlled air flow to brake cylinder 20 by way of pipe bracket portion 26 in order to control the braking of the associated railroad car. With apparatus 10 in place, however, this controlled air flow is received at opening 70 into passageway 60 and piping line 96 for termination at valve 106, instead. The controlled air flow from brake cylinder 20 is produced by controller 14 and received into pipe bracket portion 26 by way of piping line 98 and passageway 62.

Passages 64 and 68 terminate within controller 14 at respective pressure transducers (not shown) for the monitoring of brake pipe and emergency reservoir pressures. Additionally, line 112 interconnects pipe bracket 26 with a pressure transducer within controller 14 in order to monitor brake cylinder pressure.

As illustrated in FIG. 3, apparatus 10 also includes three bolt holes 114 for reception of respective anchoring bolts (not shown) for coupling apparatus 10 between service portion 24 and pipe bracket portion 26. FIGS. 4-7 illustrate in section the various passages. FIG. 5 presents a sectional view for both passages 66 and 68.

Controller 14, when de-energized, cooperates with apparatus 10 to allow operation of railroad brake system 12 in its conventional air control mode. Specifically, in the de-energized mode, valves 108 and 110 are normally closed and valve 106 is normally open, which interconnects passages 60 and 62. In this way, service portion 24 and pipe bracket portion 26 are interconnected through passages 60-68 in a manner that makes controller 14 and apparatus 10 transparent in air control operation. Thus, if controller 14 fails electronically or loses power, brake system 12 automatically reverts to conventional air control operation.

During electronically controlled operation, controller 14 is energized, cutout valve 106 remains closed, and valves 108 and 110 are controlled electronically in response to received electronic signals and in response to the pressure transducer inputs representative of auxiliary and emergency reservoir pressures and brake cylinder pressure. In particular, the internal pressure transducers in controller 14 monitor the pressures in the auxiliary and emergency reservoirs, the brake pipe and the brake cylinder by way of passages 66, 68, 64 and line 112 respectively. Electronic control of valve 108 provides air from the auxiliary reservoir received by way of passage 66 to brake cylinder 20 through passage 62 and pipe bracket portion 24. Vent valve 110 is also electronically controlled to relieve brake cylinder pressure, also by way of passage 62.

Valve 106 is normally closed during electronic operation because controller 14 replaces the control function of service portion 24. The operation of emergency portion 28 is unaffected by the presence of apparatus 10 and controller 14. Thus, a sudden drop in brake pipe pressure results in the application of emergency air from emergency reservoir 32 to brake cylinder 20 by way of emergency valve portion 28.

FIGS. 8-11 illustrate apparatus 120, which is a second and preferred embodiment of the present invention. Accordingly, similar components have the same numerical designation. Apparatus 120 is configured to incorporate internally components of controller 14 and to provide connections by way of internally machined passages or conduits, thereby eliminating the need for piping lines 96-104. As illustrated in FIGS. 8 and 9, solenoid valves 106, 108 and 110 are mounted to the sides of apparatus 120 with valves 108 and 110 being combined in a single duplex unit.

Turning now to FIGS. 10 and 11, passages 64, 66 and 68 terminate at respective pressure transducers 122, 124 and 126 for monitoring the respective pressures in brake pipe 38, auxiliary reservoir 30 and emergency reservoir 32. Additionally, passage 128 communicates with line 112 and terminates at transducer 138 for monitoring the pressure in brake cylinder 20.

The end of apparatus 120 remote from the connection with control valve 16 includes printed circuit board 132 mounted thereto with stainless steel cover 134 enclosing board 132. Electrical plug 136 allows electrical connection with board 132. The operation of apparatus 120 is the same as that of apparatus 10. Those skilled in the art will now appreciate the substantial advantages provided by the invention hereof. It allows convenient retrofit to the configuration of an existing AB valve and within the spatial limits presented on a conventional railroad car.

Having thus described the preferred embodiment of the present invention, the following is claimed as new and desired to be secured by Letters Patent:

1. An air distribution apparatus for allowing at least partial control of a railroad car braking system by an electronic control device in combination with the system, the system including an AB valve, a reservoir of pressurized air, a brake pipe and a brake cylinder, the AB valve including a service portion and a pipe bracket portion, said service and pipe bracket portions including
 a first passageway therebetween in communication with said reservoir,
 a second passageway therebetween in communication with said brake pipe, and
 a third passageway therebetween in communication with said brake cylinder, the third passageway including a service passageway section within the service portion and a pipe bracket passageway section within the pipe bracket portion,
said apparatus comprising:
 a distribution body configured for interconnection between the service and pipe bracket portions and presenting a pair of opposed faces with first, second, third and fourth openings therein,
 said first and second openings extending through said body between said opposed faces and being oriented for communication with the first and second passageways, respectively,
 said third and fourth openings each extending through a respective one of said faces and being oriented for communication with a respective one of the service and pipe bracket passageway sections,
 there being structure defining first and second conduits respectively in communication with said third and fourth openings within said body, each of said conduits being configured for connection with the electronic control device.

2. The apparatus as set forth in claim 1, said second conduit being configured for reception of controlled air flow from the electronic control device for delivery said air flow from said second conduit to said fourth opening and then to said pipe bracket passageway section for delivery thereby to the brake cylinder.

3. The apparatus as set forth in claim 1, said body further including structure defining a reservoir pressure conduit in communication with said first opening, said reservoir conduit being configured for coupling with a pressure transducer included as part of the electronic control device.

4. The apparatus as set forth in claim 1, said body further including structure defining a brake pipe pressure conduit in communication with said second opening, said brake pipe pressure conduit being configured for coupling with a pressure transducer included as part of the electronic control device.

5. The apparatus as set forth in claim 1, the service and pipe bracket portions including a brake cylinder passageway therebetween, said body including a brake cylinder opening through said body between said faces and being oriented for communication with said brake cylinder passageway and further including a brake cylinder conduit in communication with said brake cylinder opening, said brake cylinder conduit being configured for coupling with a pressure transducer included as part of the electronic control device.

6. The apparatus as set forth in claim 1, said body presenting a cylindrical configuration and having a peripheral surface, said conduits terminating at respective apertures defined in said surfaces.

7. The apparatus as set forth in claim 1, said body presenting a rectangular configuration in longitudinal cross-section.

* * * * *